United States Patent
Heston

[15] 3,675,934
[45] July 11, 1972

[54] SCREEN CHANGER MOUNTING

[72] Inventor: Eugene E. Heston, 548 Parkside Drive, Akron, Ohio 44313

[22] Filed: June 1, 1970

[21] Appl. No.: 41,800

[52] U.S. Cl. .................................277/12, 146/174, 18/12
[51] Int. Cl. .....................B29f 3/01, B76d 1/00, F16j 9/00
[58] Field of Search.................277/12, 73; 146/174; 18/12 B

[56] References Cited

UNITED STATES PATENTS

| | | |
|---|---|---|
| 3,259,390 | 7/1966 | Sanford.................................277/73 X |
| 3,436,085 | 4/1969 | Polk.....................................277/187 X |
| 3,174,759 | 3/1965 | Schwing et al............................277/73 |

FOREIGN PATENTS OR APPLICATIONS 1,490,131  8/1966  France ...................................18/12 B

*Primary Examiner*—Samuel B. Rothberg
*Attorney*—Oberlin, Maky, Donnelly & Renner

[57] ABSTRACT

A sealing arrangement between a screen changer strainer and a clamping body in which an annular rib on a sealing plate abutting the strainer fits in an annular groove in the clamping body and a hydraulically displaceable material is confined in the space between the end face of the rib and the bottom of the groove. As the clamping body is pressed against the strainer and undergoes distortion creating areas of high and low pressure around the rim, the material in the groove is displaceable circumferentially of the groove to distribute the forces evenly around the face of the rib abutting the strainer and thereby provide a tight seal and an even distribution of forces on the strainer.

2 Claims, 6 Drawing Figures

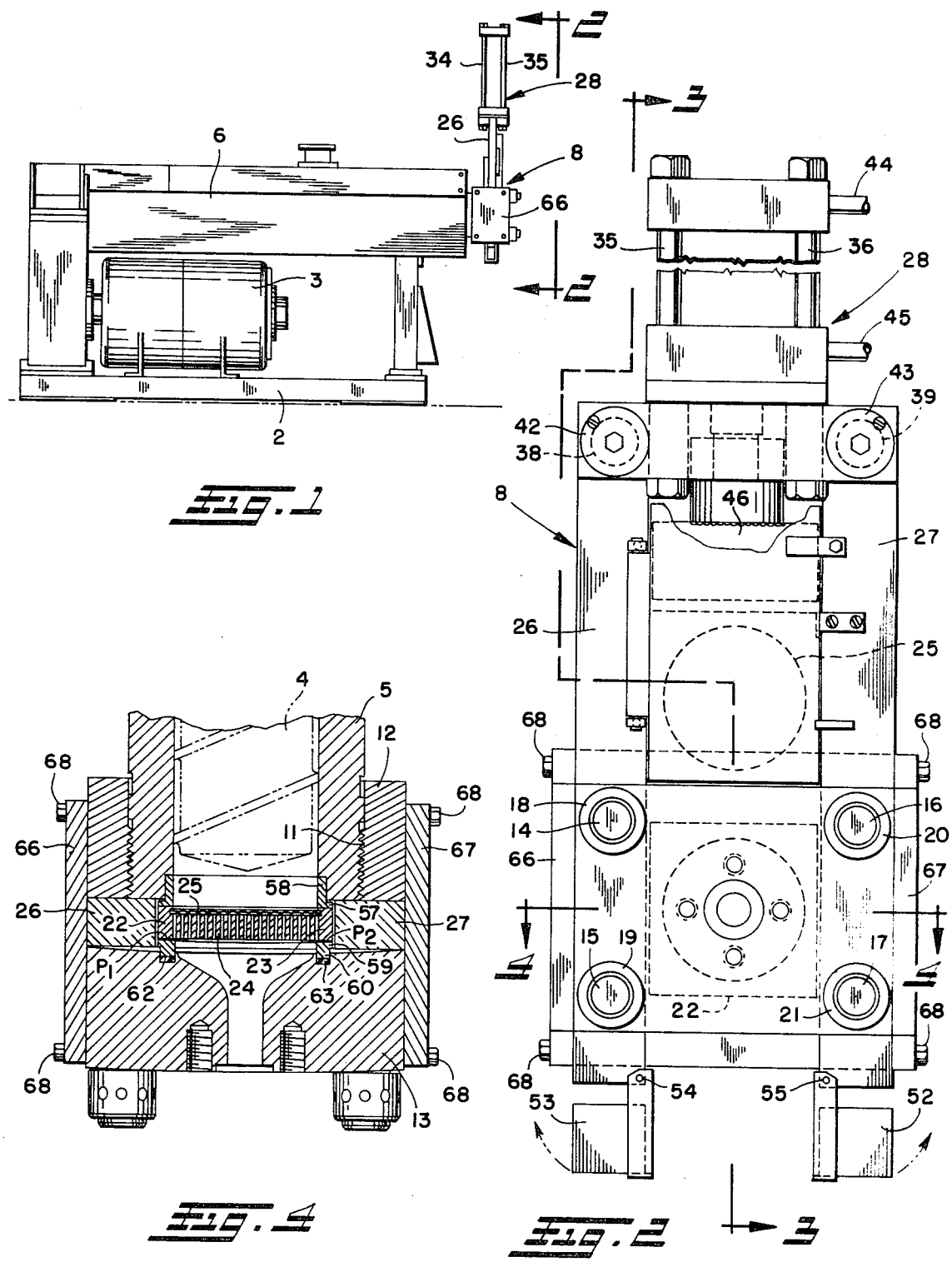

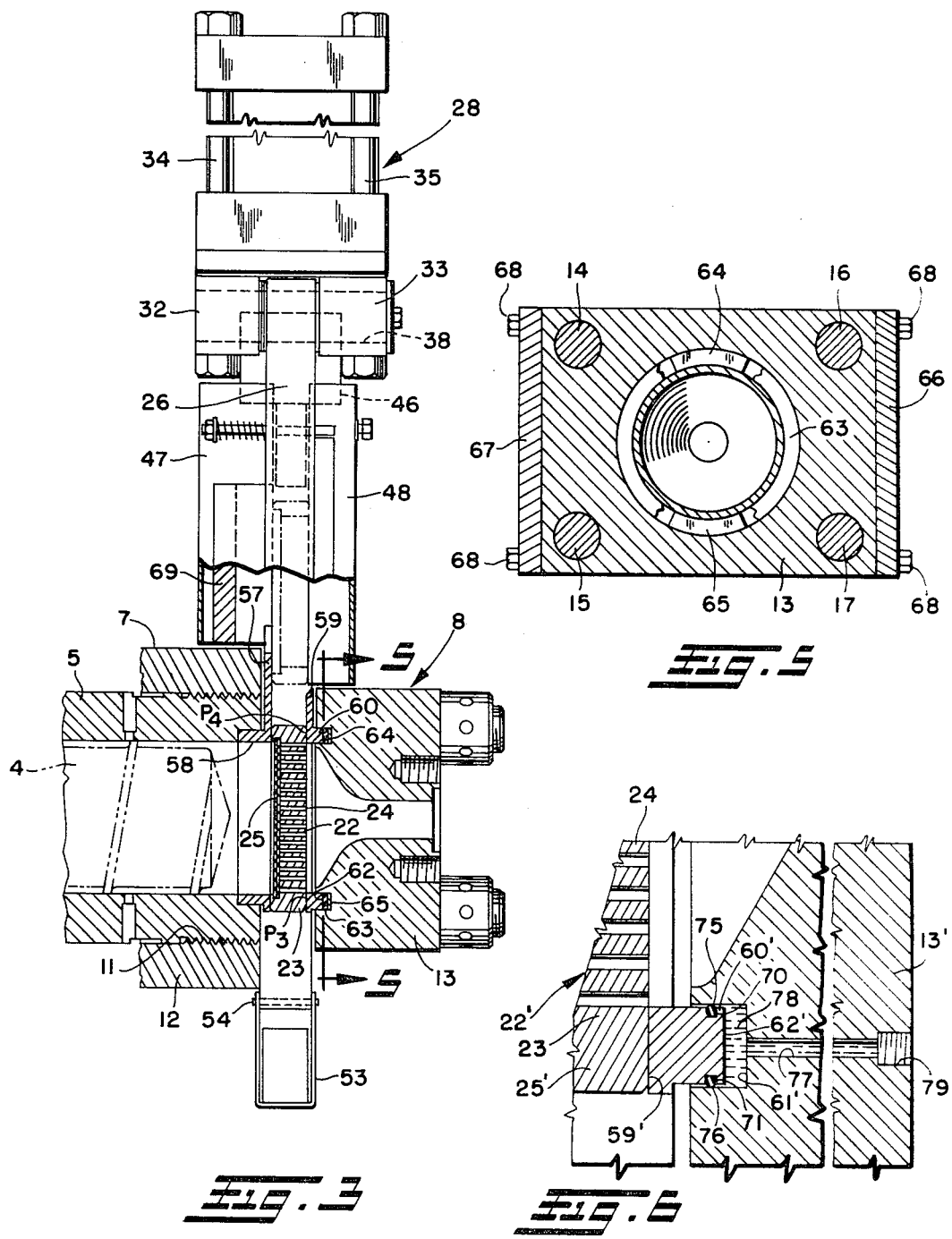

SCREEN CHANGER MOUNTING

In the extrusion of plastics, rubber and other material it is desirable and often necessary to force the material through a strainer to remove impurities and also provide the necessary back pressure in the extruder cylinder. After a period of operation the strainer becomes clogged with impurities and unplastified material and must be changed or replaced with a clean strainer. Different types of screen changers have been devised to change the strainers so that the extruder may be operated without interruption. Examples of screen changer designs proposed heretofore are shown in patents to Cowen U.S. Pat. No. 642,813, Birmingham U.S. Pat. No. 2,661,497, McIntosh U.S. Pat. 2,771,636 and Samler U.S. Pat. Nos. 2,763,308, 2,786,504 and 2,838,084.

One of the problems experienced with screen changers is maintaining a tight seal around the strainer to prevent leakage of the extruded material. In an attempt to prevent this leakage, clamping devices have been used which exert high pressures against the strainer or members carrying the screens. Difficulties have been experienced because the clamping pressure on the strainer has not been evenly distributed. This differential in the pressures exerted around the strainer increases as the clamping pressure is increased. Not only does this permit leakage but also results in points of high bearing pressure which may cause galling of the strainer as it is pushed through the screen changer.

It is a principal object of the present invention to provide a screen changer construction in which the clamping pressure on the strainer is evenly distributed.

A further object of this invention is to provide an annular chamber extending around the opening in the clamping body and a pressure distributing hydraulically displaceable material which is contained therein by an annular rib exerting pressure on the strainer.

Another object of the invention is to provide a decreased depth of the annular groove around the clamping body at those positions where the greatest deflection of the clamping body occurs to increase the pressure of the material in those areas and reduce the flow of material from the high pressure low deflection positions.

A still further object of the invention is to provide a hydraulic fluid in an annular groove around the opening in the clamping body for evenly distributing the clamping forces exerted against the strainer.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the drawings:

FIG. 1 is a side elevation of an extruder with a screen changer embodying the invention mounted thereon.

FIG. 2 is an enlarged end view taken along the plane of line 2—2 of FIG. 1 of the screen changer, parts being broken away.

FIG. 3 is an enlarged fragmentary view partly in section taken along the plane of line 3—3 of FIG. 2.

FIG. 4 is a fragmentary sectional view taken along the plane of line 4—4 of FIG. 2.

FIG. 5 is a sectional view taken along the plane of line 5—5 of FIG. 3, parts being broken away to show the shims in the grooves of the clamping body.

FIG. 6 is an enlarged fragmentary sectional view like FIG. 3 of a modification of the invention, parts being broken away.

Referring to FIG. 1, an extruder 1 is shown having a base 2 on which the extruder is supported. Drive motor 3 mounted on the base 2 is connected through a gear drive to a feed screw 4 rotatable in cylinder 5 supported by the base 2 and enclosed in a housing 6 which may contain heating and cooling apparatus. The extruder barrel 5 is shown more clearly in FIGS. 3 and 4 with the feed screw 4 being shown in phantom lines.

Material to be extruded is introduced into the cylinder 5 at a feed opening (not shown) at the left end of the extruder in FIG. 1 and the rotation of feed screw 4 will move the material to the right as shown in FIG. 1 to an outlet end 7 of the extruder 1.

A screen changer 8 is mounted on the outlet end 7 of the extruder although it is to be understood that a screen changer embodying this invention may be constructed so that it need not be mounted on the extruder but can be a unitary mechanism connected thereto by a suitable conduit.

As shown more clearly in FIGS. 2, 3 and 4, the cylinder 5 has threads 11 on the outer wall at the outlet end 7 of the extruder for receiving a threaded supporting member 12 which is screwed on the end of the cylinder 5. This supporting member 12 and a die block 13 are connected by studs 14, 15, 16 and 17 fastened to the supporting member 12 and extending through holes in the die block 13 where the ends are in threaded engagement with cylindrical nuts 18, 19, 20 and 21.

A material conducting member such as strainer 22 is interposed between the supporting member 12 and die block 13 where it is held in clamping engagement by the clamping body made up in this embodiment of the supporting member and die block. The strainer 22 has a supporting plate 23 with a recessed central strainer portion 24 for holding a screen or screen pack 25 made up of layers of screens which may have different size openings.

Side bars 26 and 27 are also interposed between the supporting member 12 and the die block 13 at the sides of the strainer 22 and have holes for receiving the studs 14, 15, 16 and 17 in supporting engagement. The side bars 26 and 27 extend upwardly from the die block 13 a distance sufficient to permit the insertion of a replacement strainer 22 above the die block. At the upper ends of the side bars 26 and 27 is a piston cylinder assembly 28 which is mounted on cross bars 32 and 33 by means of tie rods 34, 35, 36 and 37, extending through the cross bars and through the ends of the piston cylinder assembly. Pins 38 and 39 extend through aligned holes in the side bars 26 and 27 and cross bars 32 and 33 and are held in place by plates 42 and 43.

The piston cylinder assembly 28 is double-acting and preferably of a hydraulic type with conduits 44 and 45 for supplying hydraulic fluid under pressure from a suitable control and hydraulic pressure power source not shown. The piston of the piston cylinder assembly 28 extends downwardly between the side bars 26 and 27 and is connected to a ram 46 for engagement with the strainer 22. A cover plate 47 extends between the side bars 26 and 27 at the extruder side of the screen changer 8 and a spring loaded hinged safety door 48 extends between the side bars 26 and 27 on the opposite side of the screen changer for inserting strainers between the side bars in the open condition and protecting the space therebetween in the closed position.

At the lower ends of the side bars 26 and 27, U-shaped hangers 52 and 53 are pivotally mounted on pins 54 and 55 extending through the side bars. The hangers 52 and 53 receive and hold the strainer 22 which has been ejected from the screen changer 8. Removal from the hangers 52 and 53 is conveniently accomplished by movement of the hangers outwardly as shown by the arrows in FIG. 2.

Referring to FIGS. 3, 4 and 5, sealing means around the strainer portion 24 of the strainer 22 is shown more clearly. A first sealing plate 57 having a cylindrical collar 58 inset in the end of the cylinder 5, extends upwardly from between the strainer 22 and the end of cylinder over the face of the supporting member 12. This sealing plate 57 may be of aluminum-bronze to provide a sliding face over which the strainer 22 may move. A second sealing plate 59 is interposed between the strainer 22 and die block 13 and extends upwardly over the face of the die block to provide a sliding surface on which the strainer may move. This second sealing plate 59 may also be of aluminum-bronze or other similar material providing for improved sliding of the strainer 22. The second sealing plate 59 has an annular piston or rib 60 surrounding the strainer portion 24 of the strainer 22. This annular rib 60 extends into an annular cylinder or groove 61 in the die block 13 and a hydraulically displaceable material such as rubber or other rubber-like material is located in the groove 61 under a rib face 62 of the annular rib 60. The displaceable material 63 which in the preferred embodiment is silicone rubber, reacts under the great pressures imposed upon the material by the clamping action of the screen changer 8 on the strainer 22 like a fluid and is displaceable in the groove 61 to a place of less pressure. Under normal operating conditions the forces exerted by the studs 14, 15, 16 and 17 will deflect the die block 13 giving it a bowed configuration as shown in FIG. 4. This results in areas of high pressure P–1 and P–2 at the sides of the strainer 22 shown in FIG. 4. The pressures in the areas P–3 and P–4 at the center portions of the strainer 22 are substantially lower than the pressures at the areas P–1 and P–2. To compensate for this difference in pressure, the depth of the groove 61 in the vicinity of the areas P–3 and P–4 may be decreased as by placing segmental shims 64 and 65 under the displaceable material 63 in the groove 61. The thickness of the displaceable material 63 in the groove 61 for the screen changer shown which is adapted for a 6 inch extruder is approximately 0.125 inch and the segmental shims 64 and 65 have a thickness of approximately 0.010 inch.

Body heaters 66 and 67 which may be of a standard electrical type may be fastened to the supporting member 12 and die block 13 by bolts 68. A preheater may also be installed between the cover plate 47 and the side bars 26 and 27 above the supporting member 12 to preheat the strainer 22 before it is inserted between the first sealing plate 57 and second sealing plate 59.

In operation, a strainer 22 is inserted between the first sealing plate 57 and second sealing plate 59 after the screen changer 8 has been installed and clamping pressure is exerted on the strainer supporting plate 23 by tightening the cylindrical nuts 18, 19, 20 and 21. Sufficient pressure must be exerted to prevent leakage of extruded material around the strainer 22. As the nuts 18, 19, 20 and 21 are tightened, the die block 13 will be deflected and assume a bowed configuration which will tend to increase the pressure in the areas P–1 and P–2 as compared to the pressures in areas P–3 and P–4. Under this great pressure, the displaceable material 63 will act in a psuedo-hydraulic manner and flow from the areas P–1 and P–2 towards the lower pressure areas P–3 and P–4. In order to minimize the displacement of the material 63 and damage to the material if excessive flow takes place, the segmental shims 64 and 65 decrease the space between the face of the rib 62 and the bottom of the groove 70 to increase the pressure at areas P–3 and P–4 and thereby resist excessive flow from areas P–1 and P–2. In this manner, the pressures around the strainer portion 56 on the strainer supporting plate 23 will be substantially equalized and when it is time to change the strainer 22, the pressure exerted against the strainer supporting plate 23 by the first sealing plate 57 and second sealing plate 59 will also be equalized and thus avoid galling of the strainer surface which may otherwise occur because of the deflection and bowing of the die block 13.

Changing of the strainer 22 is accomplished by opening the door 48, inserting a new strainer 22, preheating the strainer with preheater 69 and actuating the piston cylinder assembly 28 so that the ram 46 moves downwardly into engagement with the clean strainer forcing it into engagement with the strainer in the operating position and moving the used strainer down into the hangers 53 and 52. The piston cylinder assembly 28 is then actuated to lift ram 46 and make room for another clean strainer 22 to be inserted and preheated. The used strainer 22 in the hangers 52 and 53 may then be removed and the screen pack 25 cleaned. It can be seen that as the strainer 22 is inserted and rammed into the position, the hydraulically displaceable material 63 in the groove 61 is capable of yielding to relieve the stresses imposed on the strainer as it is pushed through the slot or passage between the supporting member 12 and the die block 13. Accordingly, the construction shown not only distributes the pressure and stresses around the strainer 22 in the operating position, but also accommodates unusual stress distributions during the screen changing operation which may occur due to chamfering of the leading edges of the strainer supporting plate 23 or other causes.

Referring to FIG. 6, a modification of the invention is shown in which the annular rib 60' has circumferential grooves 70 and 71 for carrying sealing rings such as O-rings 75 and 76 to seal off the space between the rib face 62' and the bottom of the annular groove 61'. A passage 77 is drilled in the die block 13' to which a connection to a suitable source of hydraulically displaceable high temperature hydraulic fluid 78 such as silicone grease can be made at the front end of the screen changer as at a pipe tap 79. The hydraulic fluid 78 may be injected into the space between the rib face 62' and the bottom of the annular groove 61' under pressure and will tend to equalize the pressure of the second sealing plate 59' on the strainer 22'. This will also equalize the pressure of the other sealing plate on the strainer 22'.

With this modification, it can be seen that the hydraulic fluid 78 may be maintained at a high pressure in the annular cylinder or groove 61' while material is being extruded through the strainer 22'. However, during the period when the strainer 22' is being replaced by a clean strainer, the pressure may be reduced. This not only will provide savings because of the smaller piston cylinder assembly 28' which would be required to push the strainer 22' through the screen changer 8', but it would also reduce the pressures on the strainer plates which may cause galling and other damage.

While certain representative embodiments and details have been shown for the purpose of demonstrating the invention, it will be apparent to those skilled in the art that various changes and modifications may be made therein without departing from the spirit or scope of the invention.

I, therefore, particularly point out and distinctly claim as my invention:

1. A screen changer of the type in which a strainer is forced through a slot under substantial pressure into a space in a clamping body containing an opening for conveying extruded material through said strainer comprising a sealing and sliding plate member interposed between said strainer and said clamping body, clamping pressure means for forcing said clamping body against said sealing and sliding plate member, an annular groove surrounding said opening in the surface of said clamping body adjacent to said plate member, an annular rib on said plate member disposed in said annular groove and a ring of resilient rubber-like material disposed in said annular groove beneath said annular rib, the thickness of said annular rib and said ring of resilient rubber-like material in the compressed condition being greater than the depth of said annular groove whereby there will be hydraulic displacement axially and circumferentially of said ring to compensate for deflection of said clamping body.

2. A screen changer according to claim 1 wherein clamping pressure means are provided on each side of said slot so that said clamping body is bowed between said clamping pressure means by the strainer with the deflection being greatest at positions towards the center of the slot and shim members disposed in the annular groove at said positions towards the center of the slot to reduce the hydraulic displacement of said resilient rubber-like material.

* * * * *